Feb. 29, 1944.   J. H. COX   2,342,791
VAPOR ELECTRIC DEVICE
Filed May 21, 1942   3 Sheets-Sheet 1

WITNESSES:

INVENTOR
Joseph H. Cox.
BY
ATTORNEY

Feb. 29, 1944.          J. H. COX          2,342,791

VAPOR ELECTRIC DEVICE

Filed May 21, 1942        3 Sheets—Sheet 3

WITNESSES:
Edward Michaels
James F. Young

INVENTOR
Joseph H. Cox.
BY
S. A. Stricklett
ATTORNEY

Patented Feb. 29, 1944

2,342,791

UNITED STATES PATENT OFFICE 2,342,791

VAPOR ELECTRIC DEVICE

Joseph H. Cox, Forest Hills, Pa., assignor to Westinghouse Electric & Manufacturing Company, East Pittsburgh, Pa., a corporation of Pennsylvania Application May 21, 1942, Serial No. 443,897

7 Claims. (Cl. 175—363)

My invention relates to a vapor electric device and, particularly, to a protective system for a plurality of parallel operating vapor electric converters.

In the operation of vapor electric converters, they are subject to random losses of commutating characteristic commonly known as arc-back. When one of several parallel operating converters is subject to an arc-back, the remaining converters feed back through the faulty converter, and unless the fault is cleared, at high speed, the current in the arcing back converter reaches a value many times greater than the normal current carried by the converter, thus causing damages not only to the converter itself, but to the associated parts such as the transformer and the associated circuit opening devices. Because of the inherent reactance of the converter and its associated parts, it takes a material time for the reverse or arc-back current to build up to these abnormal proportions, and the greater the capacity of the converters feeding the bus the greater will be the rate of build up. It has heretofore been the practice to provide protective circuits capable of interrupting the reverse current to the faulty converter in periods of the order of one to three cycles, one cycle being required for high capacity systems. Following the opening of the alternating current breaker connecting the faulty converter to the bus, and the sound converters, the short remains in the faulty converter until the alternating current breaker opens which is commercially several cycles. This is commonly accomplished by auxiliary contacts on the direct current breaker, and results in the removal from service all sections, sound as well as faulty, connected to one transformer, or through one alternating current breaker, to reduce the stresses which persist beyond a time of one cycle.

It is an object of my invention to provide a protective system capable of interrupting all forward currents in the order of one cycle, and I have found that in practice devices are available which will initiate control circuit changes in from .1 to .2 of a cycle on a 60-cycle base.

In the construction according to my invention, each converter which is normally composed of a plurality of vapor electric valves is provided with a substantially independent control system, which control system comprises an impulsing circuit for providing make-alive impulses for the individual valves of the converter, and a biasing system for providing a substantially constant direct-current bias and a superimposed alternating-current bias on the anode shields of each of the valves. The energization of the impulsing circuit and the alternating-current biasing circuit are controlled by the contacts of a high-speed reverse-current relay associated with the cathode circuit of the converter. Each of the high-speed reverse-current relays carries a plurality of contacts which operate in the event of reverse current to disconnect the alternating-current supply to all of the control systems of the parallel operating converters.

Each of the converters has connected in series with the cathode a reverse current circuit breaker which is actuated by reverse current to the faulty converter to open the cathode connection. Back contacts on this reverse current circuit breaker energizes relay means which reset or reclose the contacts actuated by the reverse current relay and restores the connection of actuating potential to all of the control systems other than the converter undergoing arc-back. An auxiliary contact on the reverse current circuit breaker opens the alternating-current supply to the control system of the converter undergoing arc-back, and thus prevents actuation or operation of the faulty converter, without the opening of the main alternating current breaker supplying the converter transformer, until such time as the converter has regained its normal condition and returned to service by reclosing the reverse current circuit breakers and the control circuits. In this manner, all of the converters are removed from service at high speeds in the event of arc-back in any converter, and the non-faulty converters are returned to service as soon as the cathode breaker of the faulty converter has been opened.

It is, accordingly, an object of my invention to provide a protective system for quenching the arcs in a plurality of parallel converters at high speed in response to arc-back or reverse current in any one of the parallel converters.

It is a further object of my invention to provide a protective system which will return the non-faulting converters of the group to service at the earliest period after the elimination of the arcs.

It is a further object of my invention to provide a protective system operating at high speed to prevent damage to a converter and its associated parts in the event of arc-back therein.

Other objects and advantages of my invention will be apparent from the following detailed description taken in conjunction with the accompanying drawings, in which.

Figure 1:
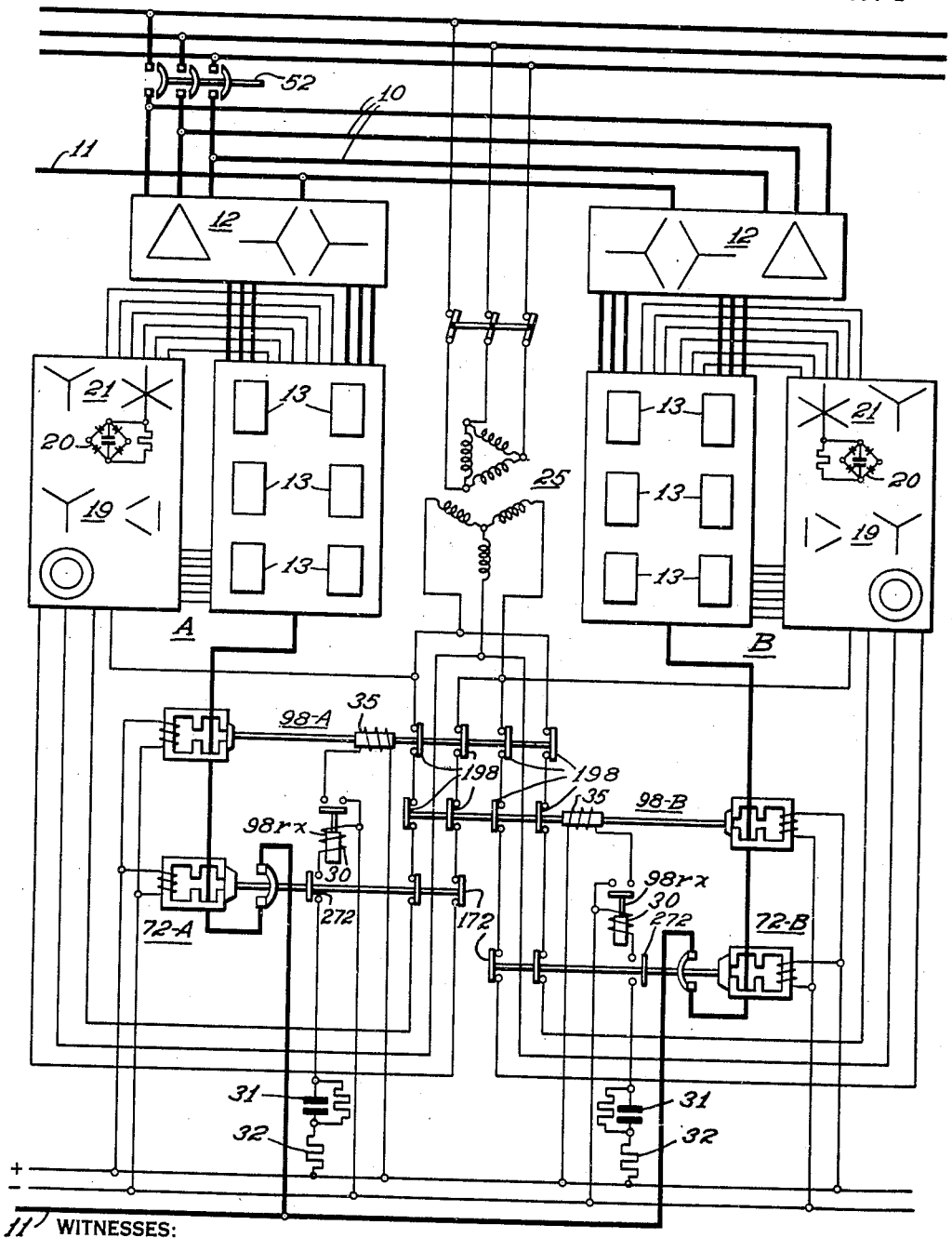
Figure 1 is a schematic illustration of the converter system according to my invention.

In the embodiment of my invention according to Fig. 1, a plurality of converters are herein illustrated as two for purposes of illustration, although it is apparent that any desired number of parallel converters may be connected. For purposes of identification, the converters have been designated as A and B. A polyphase alternating-current circuit 10 is connected to a direct current circuit 11 by means of a plurality of rectifier transformers 12 which distribute potential to the individual valves 13 of each of the converters A and B. Each valve 13 of the converter is preferably of the make-alive type and comprises a vaporizable reconstructing cathode 15 of suitable material, such as mercury, and has cooperating herewith an anode 16, preferably of graphite, which is enclosed in a de-ionizing anode shield 17, also preferably constructed of graphite and has a make-alive electrode 18 in operating contact with the cathode 15. The preferred construction of each of these valves 13 may be found in my copending application, Serial No. 409,503, filed September 4, 1941, and assigned to the same assignee as this application.

Each of the associated control systems comprises an impulsing device 19, preferably of the wave distorter type, such as shown in copending application, Serial No. 405,480, filed August 5, 1941, by Henry C. Myers, and a biasing circuit embodying a source of substantially constant direct current, herein shown as a full-wave rectifier 20 energized from a suitable alternating-current source, such as the control transformer 25 supplying potential to the impulsing device 19 and to a biasing tansformer 21 which applies an alternating-current biasing potential having peak voltages exceeding the potential of the direct-current biasing source 20. The source 25 of control potential is connected to the impulsing device 19 and biasing transformer 21 of each of the control devices by means of the contacts 198 of high speed relays 98 associated with the direct-current connection of each of the converters A—B. Each of these high speed relays 98 is preferably of the shunt magnetic type, and each relay 98 carries a plurality of contacts for disconnecting all of the control systems of the parallel connected converters A—B. There will, therefore, be as many high-speed reverse-current relays 98 as there are parallel connected converters A—B, and each of the relays 98 will be designated A and B for purposes of identification. Also associated with the direct-current lead of each of the converters A—B is a reverse-current circuit-breaker 72 operating in the event of a reverse current to disconnect the faulty converter from the direct-current busses 11. The reverse-current circuit-breaker 72 may be of any desired speed. It normally is slower than the high-speed reverse-current relay 98 which has been found to be capable of operating at speeds of the order of .1 of a cycle. The reverse-current circuit-breakers 72 carries auxiliary contacts 172 which open to disconnect the source of control potential 25 from the control system of the converter undergoing arc-back. The reverse current circuit breaker 72 also carries a back contact 272 which energizes a reset relay 98rx, the operating coil 30 of which is energized through a capacitor 31 and a resistor 32 so that the relay 98rx will pick up momentarily and then reopen. The reset relay 98rx on picking up energizes a reset coil 35 on the high speed relay 98 of the faulty converter, resetting the relay 98 and reclosing the contacts 198 actuated thereby.

In the operation of the system according to this embodiment, upon the occurrence of a reverse current or arc-back, the high speed relay 98 of the faulty converter, such as converter A, will open at high speed, opening all of its contacts 198 and deenergizing all of the control systems, thereby discontinuing the ignition impulses and the alternating-current biasing potentials supplied to the shields 17, leaving the direct-current biasing source 20 operative to prevent operation of all of the converters A—B. The reverse current impulse which actuated the high-speed relay 98 will also actuate the reverse-current circuit-breaker 72, which, may be of a slower type and the reverse-current circuit-breaker 72 will open the direct-current connection of the faulty converter A. At the same time, the auxiliary contacts 172 of the reverse-current circuit-breaker 72 will open the supply leads to the control system of the faulty converter A, and a back contact 272 will energize the reset relays 98rx which resets the contacts 198 of the high-speed relay 98 and restores operating potential to the control systems of all of the non-faulting converters.

Figure 2:
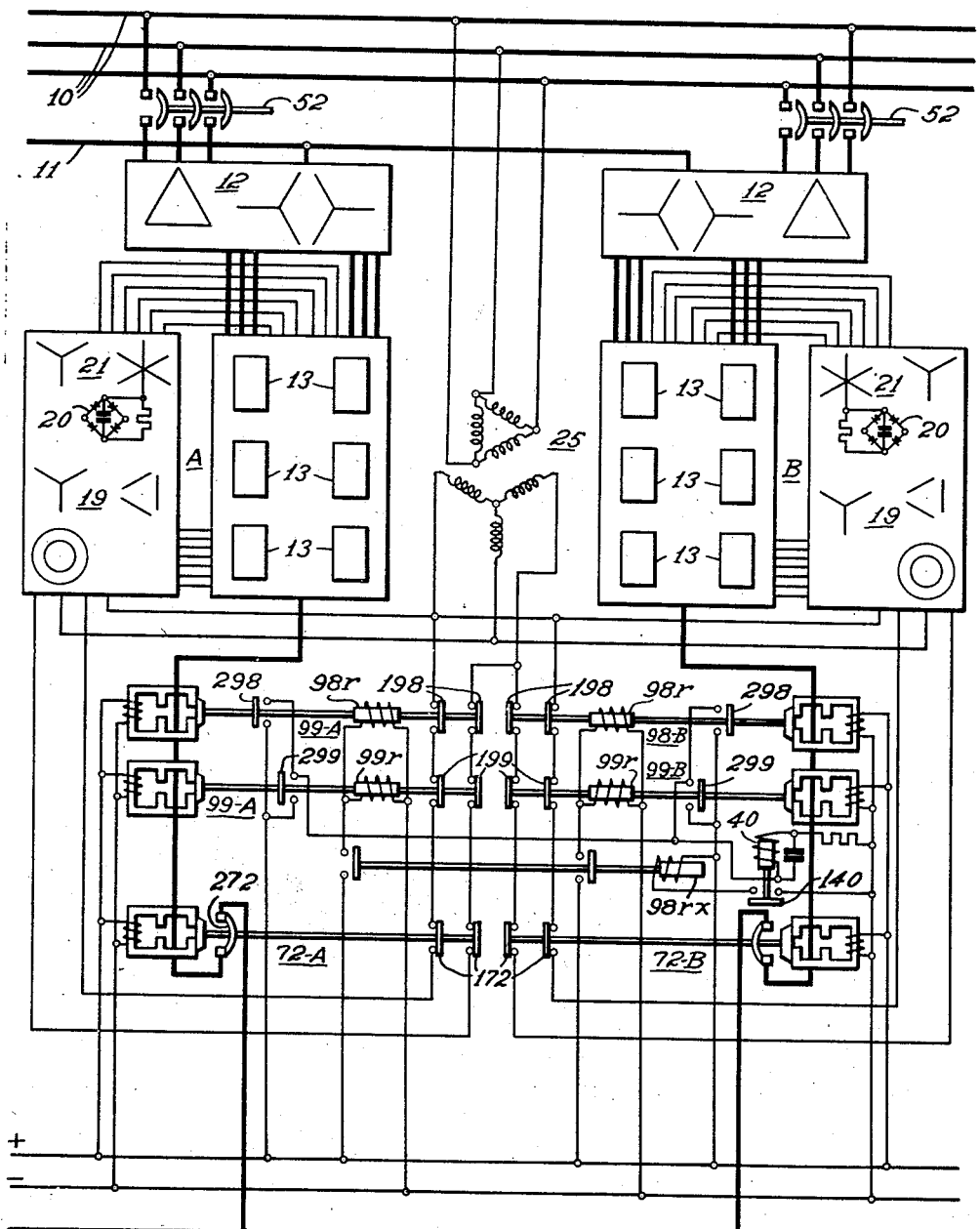
Fig. 2 is a similar view showing a modified connection according to my invention.
Figure 3:
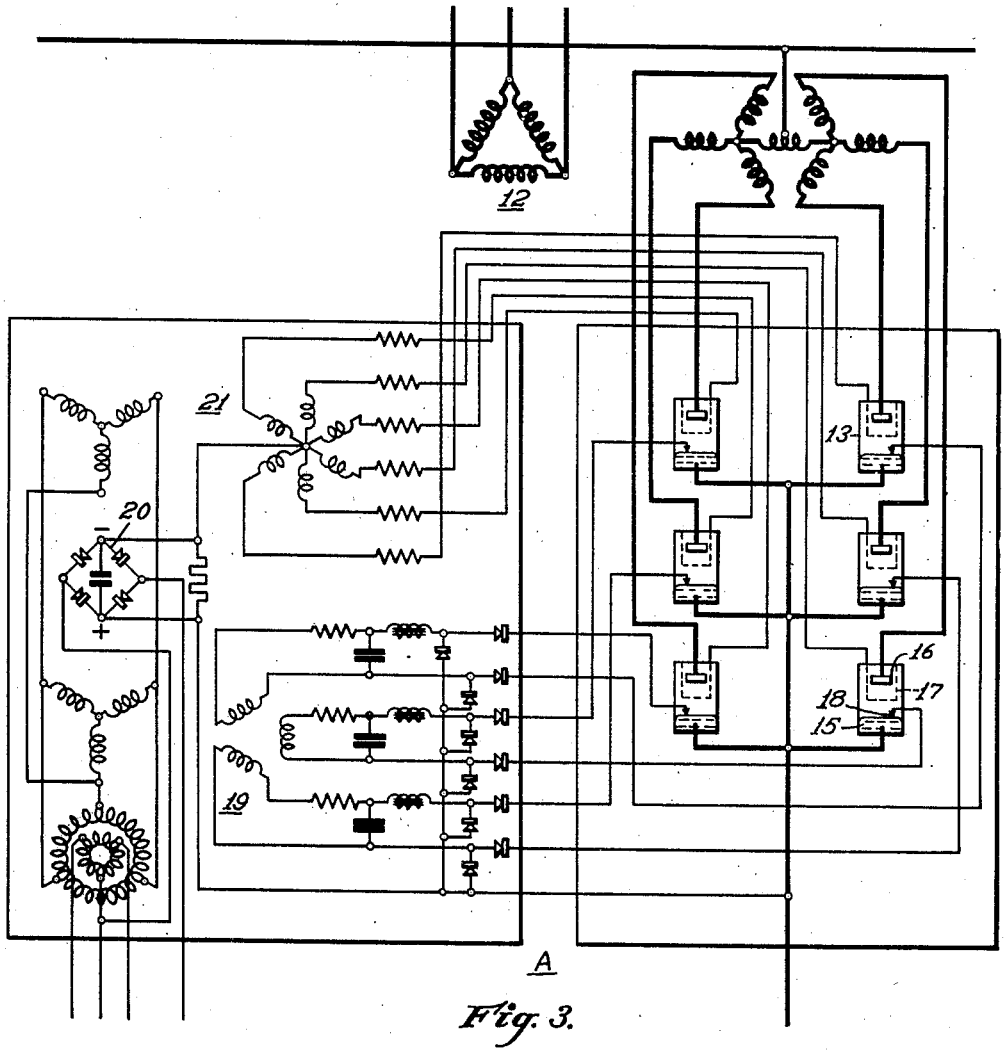
Fig. 3 is a schematic detailed diagram of the connections of a converter and its associated control system.

In the illustrative embodiment according to Fig. 2, the high-speed reverse-current relays 98 have had their contacts 198 rearranged and overcurrent relays 99 added to enlarge the scope of the protection afforded to include not only reverse current or arc-back but overcurrent from any source such as a short on the load circuit 11.

The high-speed reverse-current relays 98 have contacts 198 controlling only the alternating current supply of the associated control system of the rectifier undergoing arc-back while the overcurrent relays 99 have contacts 199 also controlling the connection of the associated control system.

Each of the relays 98 and 99 carries an auxiliary back contact 298 or 299, all of said back contacts 298 and 299 being connected in parallel so that the opening of any relay 98 or 99 will energize a time relay 40 which after a predetermined time interval will close its contacts 140 and energize a reset relay 98rx. Upon energization of relay 98rx, it closes its contacts, energizing the reset coils 98r and 99r of relays 98 and 99.

Assuming that an arc-back occurs in any parallel converter, such as, for example, A, then the reverse-current relay 98—A would operate at high speed, opening its contact 198 in a time of the order of .1 cycle and discontinue the impulses to the make-alive electrode and the anode shields of converter A while the direct current bias of source 20 would tend to prevent any valves 13 of converter A not already carrying current from becoming involved in the arc-back condition. The overcurrent drawn from the remaining non-faulty converters would operate their overcurrent relays 99 at high speed and discontinue the make-alive and shield impulses and because of the direct bias from source 20 determines current flow from the non-faulty sections. The reverse current circuit breaker 72-A also opens and disconnects the converter A from the direct current buses 11. The opening of relays 98 or 99 has in the meantime energized timer relay 40 through contacts 298 and 299, which, after a predetermined interval closes its contacts and either directly or through a reset relay 99rx energizes the reset coils 98r and 99r to reset the relays 98 and 99 and restore service from the non-faulting converters while the auxiliary contacts 172 of the 72-A breaker of the faulty section prevents reenergization of the control system of the faulty converter.

In the event of overcurrent for any reason such as a short on the direct current bus 11, the high-speed over-current relays 99 will operate to remove the alternating current bias from the anode shields and the make-alive impulse thus terminating current flow through the converters. The operation of the relays 99 closes the back contacts 299 setting in operation the timing relay 40 which, after a time delay, reestablishes the control impulses so that the converters again deliver current, and if the fault has not been cleared, the relays 99 will again operate. Preferably lockout means (not shown) are provided to permanently close down the converters after a predetermined successive reclosure of the relay 99, or one of the well known load measuring systems can be applied to lockout the converter as long as the overcurrent condition exists.

While, for purposes of illustration, I have shown and described specific embodiments of my invention, it will be apparent that changes and modifications can be made therein without departing from the true spirit of my invention or the scope of the appended claims.

I claim as my invention:

1. A vapor-electric translating system for interconnecting a polyphase alternating-current circuit and a direct-current circuit comprising a plurality of parallel connected vapor-electric converters interconnecting said circuits, each of said converters including a plurality of vapor electric valves, each valve including an anode, a vaporizable reconstructing cathode, a make-alive electrode and an anode shield, a substantially independent control system for each of said converters, each of said control systems including an impulsing device for supplying control impulses to the make-alive electrodes, a source of direct-current biasing potential for said anode shields and a source of alternating-current biasing potential for said shields, a high-speed reverse-current relay for each of said converters, a source of alternating control potential, contact means actuated by said high-speed reverse-current relay for disconnecting said source from all of said control systems, a reverse-current actuated circuit breaker in series with each of said converters, means actuated by operation of said circuit breaker for reclosing the contacts actuated by said high-speed reverse-current relay and switching means actuated by said reverse-current circuit breaker for deenergizing the control system of the converter associated with the reverse-current circuit-breaker.

2. A protective system for a plurality of parallel operating vapor electric converters comprising a control system for each of said converters, each of said control systems containing a constantly energized direct-current device tending to maintain the valves of said converters non-conductive, and alternating-current devices tending when energized to overpower said direct-current device and periodically render the valves of its converter conductive, a source of alternating-current potential, a plurality of fault responsive high-speed relays associated with the direct-current connection of each of said converters, a reverse-current circuit-breaker connected in series with each of said converters, contacts actuated by each of said fault responsive relays, auxiliary contacts on each of said reverse-current circuit-breakers, circuit means from said source of control potential to each of said control systems, each of said circuit means including the contacts of the relays associated with all of the converters and the auxiliary contacts of the particular series connected reverse-current circuit breaker.

3. A vapor-electric device comprising a plurality of vapor-electric converters interconnecting a polyphase alternating-current circuit and a direct-current circuit, each converter including a plurality of make-alive type electric valves, each of said valves including an anode, a cathode, a control electrode and an anode shield, a control system for each of said converters each of said control systems including an impulsing device, a direct-current shield biasing device and an alternating-current shield supply device, a source of alternating control potential connections from said source to each of said control systems for supplying said impulsing device and said alternating current shield supply device, a high-speed fault responsive relay for each of said converters, switching means actuated by said relays for opening said connections for deenergizing said impulsing devices and said alternating-current shield supply device.

4. A protective system for a plurality of parallel operating vapor electric converters of the make-alive type comprising a control system for each of said converters, said control system including a constantly energized means tending to maintain the associated converter nonconducting and control means operative when energized to overcome said constantly energized means to render the converter conducting, a source of potential for said control means, a plurality of high-speed fault responsive relays for each converter, contacts actuated by said relays, separate circuit means from said source to each of said control systems, each of said circuit means including the contacts actuated by the relays of the associated converter, a reverse current circuit breaker in series with each converter, auxiliary contacts carried by said circuit breaker, said auxiliary contacts being in series with the circuit means of the associated control system, and means for reclosing said relays after a predetermined interval.

5. A vapor-electric conversion system for interconnecting a polyphase alternating current circuit and a direct-current circuit comprising a plurality of parallel connected multivalve converters, each of said valves including a vaporizable cathode, an anode, an anode shield and a control electrode, a control system for each of said multivalve converters, each of said control systems including an impulsing means for supplying control impulses to the control electrode, means for impressing a direct-current potential on the anode shields and means for impressing an alternating-potential on the anode shields, a source of polyphase control potential, circuit means for connecting said source to the means for impressing alternating current on the anode shields and to the impulsing means of each control system, a second circuit means for energizing said means for impressing direct-current potential on the anode shields, a high-speed reverse-current relay for each of said converters, switching means actuated by said reverse-current relay for interrupting the circuit between said first mentioned circuit means, a reverse current circuit breaker for each of said converters, and switching means actuated by said reverse current circuit breaker for interrupting the circuit means energizing the associated control system.

6. A protective system for a plurality of parallel operating multivalve converters, each valve of said converter including a main anode, a de-ionizing electrode associated with said anode, a cathode and an exciting electrode associated with said cathode, comprising a control system for each of said converters, each of said control systems including a constantly energized direct-current device for impressing potential on the de-ionizing electrode of each of the valves of said converters tending to maintain said valves inoperative and alternating-current devices acting when energized to overcome said direct-current device and render the valves periodically conducting, a high-speed reverse current relay associated with the direct-current connection of each of said converters, contacts actuated by said relays, a reverse-current circuit breaker connected in series with each of said converters, auxiliary contacts carried by said circuit breaker, a source of alternating-current control potential, circuit means from said source to each of said control systems, each of said circuit means including contacts actuated by each of said relays and each of circuit means including the contacts of the associated circuit breaker.

7. A vapor-electric system comprising a plurality of vapor-electric converters interconnecting a pair of dissimilar electric circuits, each converter including a plurality of vapor-electric valves, each of said valves including an anode, a cathode, an exciting electrode and an anode shield, a control system for each of said converters, each of said control systems containing a direct-current device tending to maintain the valves of said converter inoperative and alternating current exciting means tending when energized to overpower said direct-current device to render the valves of the converter periodically conductive, a source of alternating current control potential, circuit means connecting said source to the alternating current exciting means of each of said control systems, a high-speed fault responsive relay associated with the current connection of each converter, contacts operated by said relays each of said relays operating contacts to open the circuit means of all of said alternating current exciting means, a fault responsive circuit breaker for each converter, auxiliary contacts on said circuit breakers, said auxiliary contacts operating to control the circuit connection of its associated control system and means operating to reset the fault responsive relays after opening of said circuit breaker.

JOSEPH H. COX.